(12) United States Patent
Young (10) Patent No.: US 8,061,169 B2
(45) Date of Patent: Nov. 22, 2011

(54) LOCKING SYSTEM WITH HIDDEN KEYED ACCESS

(75) Inventor: Linda Young, Edmonton (CA)

(73) Assignee: Pinhead Components, Inc., Edmonton (CA)

( * ) Notice: Subject to any disclaimer, the term of this patent is extended or adjusted under 35 U.S.C. 154(b) by 728 days.

(21) Appl. No.: 12/067,144

(22) PCT Filed: Sep. 15, 2006

(86) PCT No.: PCT/CA2006/001519
§ 371 (c)(1),
(2), (4) Date: Mar. 31, 2008

(87) PCT Pub. No.: WO2007/030942
PCT Pub. Date: Mar. 22, 2007

(65) Prior Publication Data
US 2008/0223095 A1    Sep. 18, 2008

(30) Foreign Application Priority Data

Sep. 15, 2005  (CA) ........................ 2519843
Aug. 25, 2006  (CA) ........................ 2557223

(51) Int. Cl.
*E05B 13/02*    (2006.01)
(52) U.S. Cl. ............... 70/423; 70/455; 70/416; 70/419; 70/233; 411/910
(58) Field of Classification Search ........... 70/233, 70/421, 423, 455, 408, 416, 419; 411/910
See application file for complete search history.

(56) References Cited

U.S. PATENT DOCUMENTS

| | | | |
|---|---|---|---|
| 3,343,386 A * | 9/1967 | Hall | 70/423 |
| 3,765,199 A | 10/1973 | Wiczer | |
| 4,125,051 A | 11/1978 | Herkes et al. | |
| 4,302,137 A * | 11/1981 | Hart | 411/432 |
| 4,584,855 A * | 4/1986 | Burlingame | 70/38 A |
| 4,686,840 A | 8/1987 | McCarroll | |
| 5,033,501 A | 7/1991 | Stehling | |
| 5,195,340 A * | 3/1993 | Huang | 70/38 A |
| 5,331,830 A * | 7/1994 | Su | 70/38 A |
| 5,406,812 A * | 4/1995 | Jaw | 70/38 A |
| 5,488,845 A * | 2/1996 | Hsieh | 70/38 A |
| 6,055,833 A * | 5/2000 | Ding-Chiang | 70/39 |
| 6,341,927 B2 | 1/2002 | Hampson et al. | |
| 7,007,522 B1 * | 3/2006 | Lee | 70/43 |
| 7,013,686 B1 * | 3/2006 | Chen | 70/43 |
| 7,043,949 B2 * | 5/2006 | Ross et al. | 70/404 |
| 7,866,194 B2 * | 1/2011 | Liu | 70/395 |
| 2003/0019259 A1 * | 1/2003 | Nicodemus et al. | 70/233 |
| 2010/0024497 A1 * | 2/2010 | Wu | 70/419 |
| 2010/0326149 A1 * | 12/2010 | Chang et al. | 70/423 |

FOREIGN PATENT DOCUMENTS

EP      0 0064 087     11/1982
WO   WO 2004/076269   9/2004

* cited by examiner

*Primary Examiner* — Suzanne Barrett
(74) *Attorney, Agent, or Firm* — Woods Oviatt Gilman LLP; Katherine H. McGuire, Esq.

(57) ABSTRACT

The present invention provides a locking system that is more secure and theft resistant than traditional key and cylinder systems. A hidden locking system is provided where access to the locking mechanism is hidden from view and cannot be rotated or engaged by screwdrivers, pens or other common tools. In another aspect the present a primary and all related secondary locking systems on an object such as a bicycle. In a further aspect the present invention provides lockup in applications where large and bulky key and cylinder systems are not possible or practical.

6 Claims, 7 Drawing Sheets

LOCKING SYSTEM WITH HIDDEN KEYED ACCESS

FIELD OF THE INVENTION

The present invention relates to a locking system with hidden keyed access that cannot be engaged or rotated other than with a special coded key. The locking system can be applied to a variety of locking applications but has particular applicability in the recreation industry including bicycles.

BACKGROUND OF THE INVENTION

Various key and cylinder locking systems are known where the locking cylinder is exposed so that a key can be inserted to unlock the device. Such systems can be relatively easily picked or tampered with by inserting a slender object into the cylinder opening. Recently it has been shown that even a pen can open some known locking systems.

Forcing a sharp-pointed object into the cylinder opening can also easily damage Key and cylinder systems. Key and cylinder systems are large and bulky and are not practical in many applications where space is not available such as bicycle wheels.

There is a need for a locking system that is more secure and theft resistant than traditional key and cylinder systems.

SUMMARY OF THE INVENTION

The present invention provides a locking system that is more secure and theft resistant than traditional key and cylinder systems.

In preferred embodiment the present invention provides a locking system with hidden keyed access where access to the locking mechanism is hidden from view and cannot be rotated or engaged by screwdrivers, pens or other common tools.

In another aspect the present invention provides one combination key that operates a primary and other related secondary locking systems on an object, such as a bicycle.

In a further aspect the present invention provides lockup in applications where large and bulky key and cylinder systems are not possible or practical.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
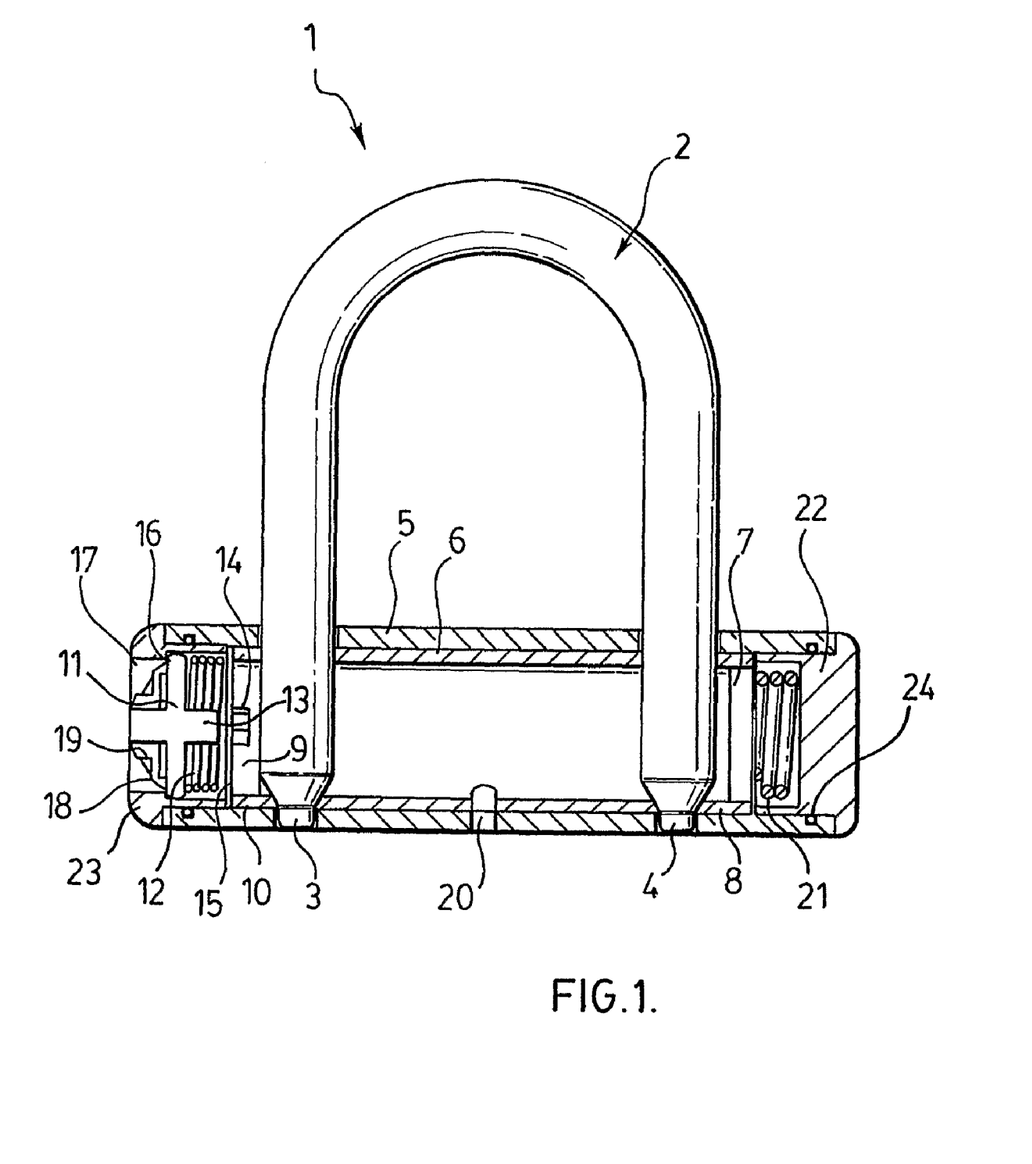
FIG. 1 is a side plan view partially in cross-section of a primary locking system in the form of a U-Lock without hidden keyed access of the present invention
Figure 2:
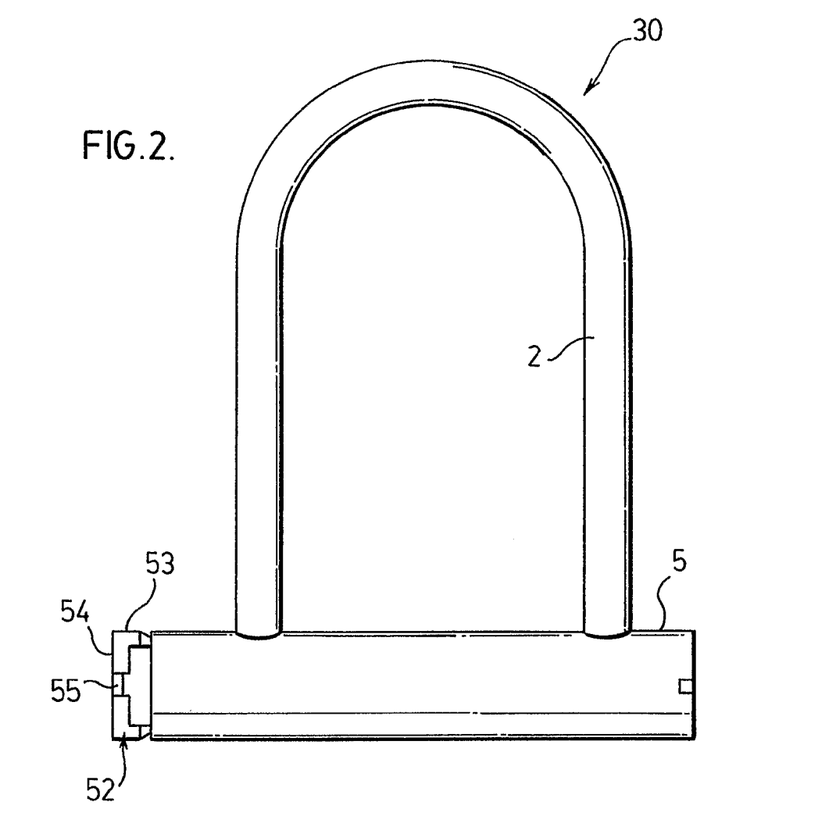
FIG. 2 is a side plan view partially in cross-section of the U-lock of FIG. 1 having one embodiment of a hidden keyed access according to the present invention.
Figure 3:
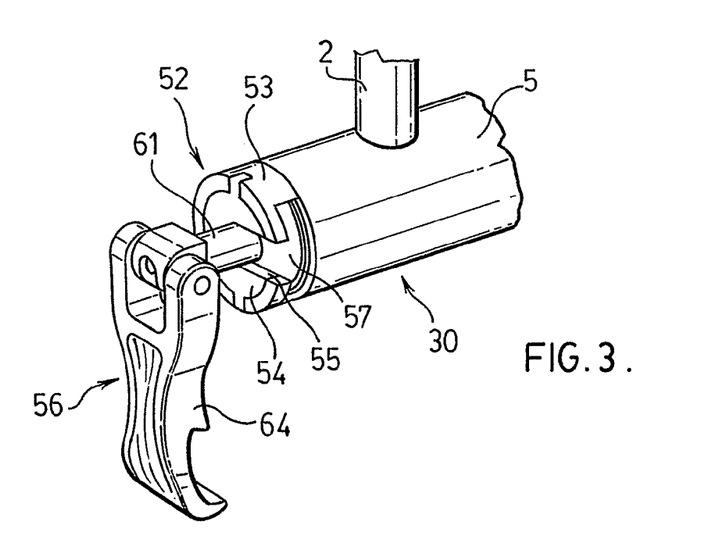
FIG. 3 is an enlarged perspective view of one end of the U-lock of FIG. 2 a key inserted into the hidden keyed access.
Figure 4:
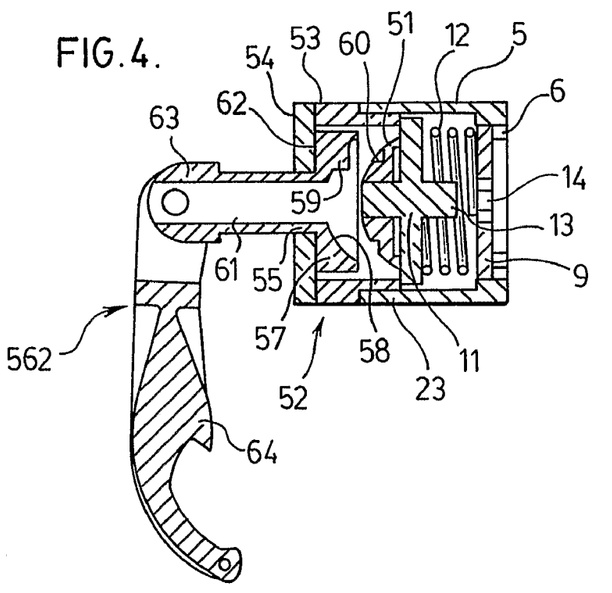
FIG. 4 is a side view in cross section of the key and hidden keyed access of the locking system of FIG. 3 with the key not engaged.
Figure 5:
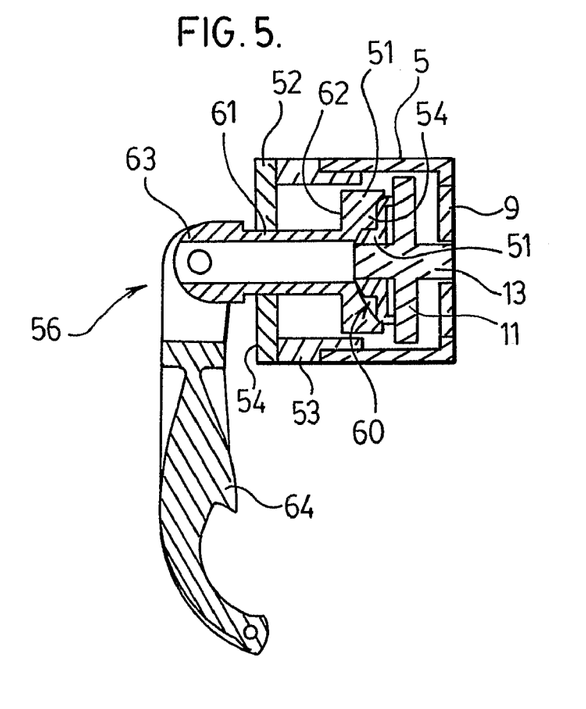
FIG. 5 is a side view in cross section of the key and hidden keyed access of the locking system of FIG. 3 with the key engaged.

While the present invention may be used in a wide variety of applications one embodiment will be described with reference to a U-lock which can be used for locking up a variety of objects particularly bicycles. With reference to FIG. 1 one embodiment of a U-Lock is illustrated. The U-lock, generally indicated at 1, consists of a U-shaped shackle 2 designed to have its ends 3,4 inserted within a cylindrical tube or lock body 5. The locking mechanism includes within the lock body 5, an inner tube 6, that is adapted to be rotated by a key from a locking to an unlocking position and back, to lock and unlock shackle 2 within the lock body 5. The inner tube 6 has an end plug 7 at one end 8 and a driven plug 9 at the other end 10. A driver 11 is biased away from contact with the driven plug 9 by compression spring 12 or other suitable bias means. Driver 11 is equipped with a projecting shaft 13 sized and shaped to fit within a corresponding hole 14 on the face 15 of the driven plug 9. In FIG. 1 both projecting shaft 13 and the hole 14 on driven plug 9 have a hex-shaped cross-section albeit other shapes are possible. The face 16 of the driver 11 remote from shaft 13 is provided with keyed access means that can be engaged by a key to rotate driver 11. In the embodiment shown the keyed access means includes a convex nut 17 that is attached to driver 11. The means of attachment in FIG. 1 is that nut 17 is threaded on and then riveted to driver 11. A convex face 18 of nut 17 is preferably provided with at least two cutouts 19 spaced away from the axis of rotation of nut 17. The cutouts 19 are located, sized and shaped for engagement by the mating member on a specific key (not shown) for rotation of the nut and driver about their axis. The cutouts 19 and key are preferably of the type described in U.S. Pat. No. 6,341,927.

To operate the U-Lock of FIG. 1, a combination key (not shown) is inserted onto and into engagement with nut 17 so that projections on the key engage the cutouts 19 on nut 17. As noted above nut 17 is fixed to one side of driver 11. The driver 11 is floating in the lock body 5 by the weak compression spring 12. Unless the driver 11 is pushed in parallel with its axis, the shaft 13 on the driver 11 cannot engage with the hole 14 in the driven plug 9. The driven plug 9 is welded on the inner tube 6 so the inner tube 6 can be turned with the rotation of the driven plug 9. On the inner tube 6 there are two XXD" holes to hold the shackle 2 and the shackle 2 goes through to the opposite side. The inner tube 6 also rotates limited angle and held in place by a lock pin 20. The end plug 7 is welded on the other end of the inner tube 6 and has a space for holding a torsion spring 21. The torsion spring 21 is held between the end plug 7 and an end cover 22.

Rotating the driven plug 9 can release the shackle 2. A nut end cover 23 is provided around the nut 17. End cover 22 and nut end cover 23 are held in place by wire rings 24.

In the embodiment of the U-Lock shown in FIG. 1, co-axial access to the nut 17 or other keyed access means is unhindered. In the embodiment shown in FIG. 1, nut 17 is recessed within nut end cover 22 to prevent access from the side. To preclude unhindered co-axial access to the nut 17 or other keyed access means, the present invention, as shown in FIGS. 2-5, provides an outer cylinder casing according to one embodiment of the present invention enclosing keyed access means, in this case the nut. By hiding the keyed access means to direct access, the keyed access means cannot be engaged or rotated other than with a matching coded key. While FIGS. 2 to 5 only show the locking system with hidden keyed access means of the present invention in conjunction with a U-lock, the hidden keyed access means can be used with other locking applications. For example on a bicycle there may be locking skewers used to hold the wheels and/or seat in place and/or locking head sets to hold the handle bars in place and/or locking skewers on vehicle racks. In accordance with the present invention, one combination key can be provided to lock and unlock the primary locking device (i.e. the U-lock) retaining the bicycle to a fixed object such as a bike rack and the other component secondary locking systems on the bicycle (i.e. locking skewers, head set etc.).

In the embodiment shown in FIGS. 2-5, the present invention features a keyed access means in the form of a convex combination nut and a concave combination key which match one another to provide positive engagement. The convex combination nut is recessed and hidden from view within a protective enclosure. To operate the lock, the key must first be-inserted through a narrow slot in the side of the protective enclosure. The key can then be plunged towards the combination nut to create positive engagement. The present invention is a significant improvement over the prior art by providing a locking mechanism that is not accessible or visible and thus is more difficult to pick or tamper with.

With reference to FIGS. 2-5 the U-lock 30 has a similar construction to the U-lock shown in FIG. 1. In FIGS. 2-5, a keyed access means in the form of a combination nut 51 (number 17 in FIG. 1) is housed within an outer casing 52. The combination nut 51 is preferably of the type described in U.S. Pat. No. 6,341,927. The operative components of combination nut 51 are preferably at least two cutouts provided on the face of the combination nut 51 and spaced away from the axis of rotation. The cutouts are located, sized and shaped for engagement by the mating member on a specific key for rotation of the nut about its axis. Outer casing 52 has a cylindrical outer wall 53 and end wall 54. Cylindrical outer wall 53 and end wall 54 hide the operative components of combination nut 51 from view and prevent the use of common tools to engage and rotate the combination nut 51. A narrow slot 55 is provided within the cylindrical outer wall 53 and end wall 54. The casing 52 can have any shape but in the embodiment illustrated is cylindrical and sized to fit on the end of the lock body of the U-lock. In other applications the size and shape of the casing 52 may vary to fit the application. The key 56 in the embodiment shown (see FIGS. 3-5) has a body portion 57 with a concave engaging surface 58 with projections 59 coded to match the size, shape and location of the cutouts 60 on combination nut 51. A shaft 61 extends from the surface 62 of body portion 57 opposite the concave engaging surface 58. At the free end 63 of shaft 61 is a handle 64 pivotally mounted to shaft 61. The shaft 61 is sized to fit in slot 55. The key 56 operates the lock by first inserting it through slot 55 in the outer casing 52 and then plunging it towards combination nut 51 to cause active engagement with the combination nut 51.

Figure 6:
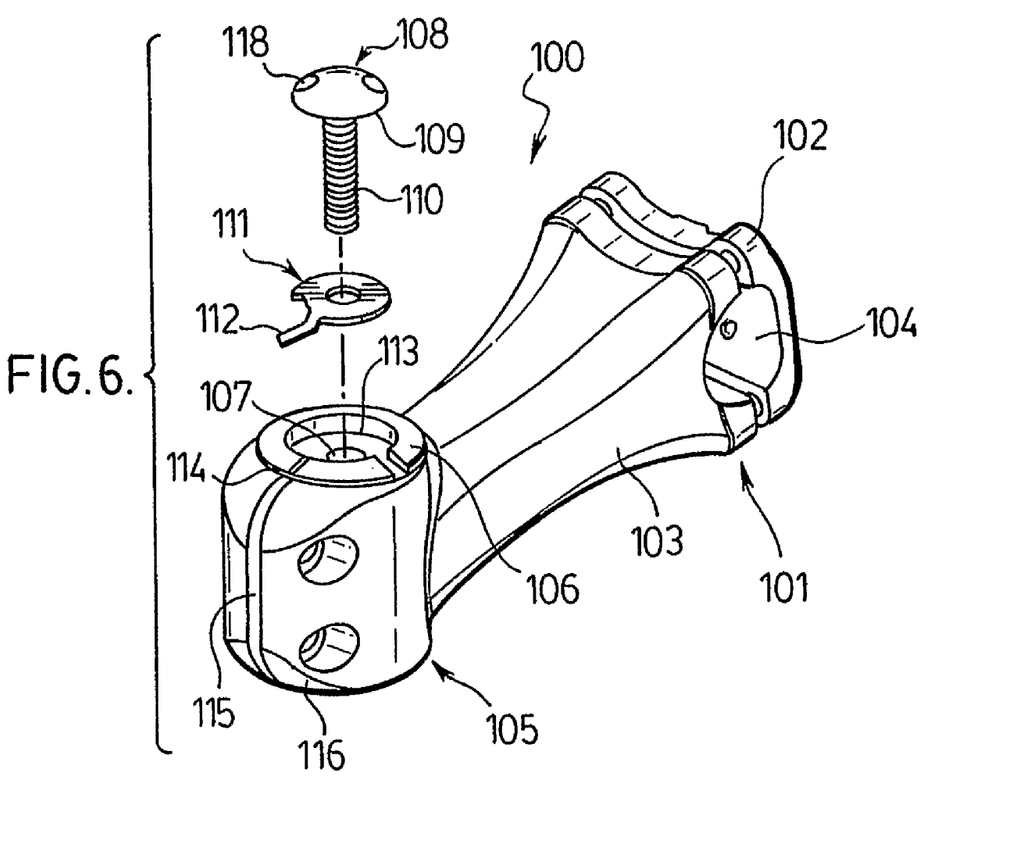
FIG. 6 is a perspective view of a secondary component locking system in the form of a bicycle head set.

FIG. 6 illustrates another locking application where use of the same key as used on the primary locking system i.e. U-lock, can be used to lock a secondary component locking system in the form of a bicycle head set. The head set, generally indicated at 100, is used to hold the handle bars to the bike. One end 101 of the head set 100 is equipped with a clamp member 102 which can be tightened to the body 103 of head set 100 to hold the handle bars (not shown) in the recess 104 defined between the end 101 of head set 100 and clamp member 102. The other end 105 of the body 103 of head set 100 is adapted to connect the head set to the frame of the bicycle. A top cap or casing 106 is provided around a vertical hole 107 in the end 105 of the body 103 of head set 100. Keyed access means in the form of bolt 108, having a convex head 109 and threaded shaft 110, is recessed within top cap 106 with shaft 110 passing through the hole 107 and threading into the bike frame (not shown) to hold the head set in place. The convex head 109 of bolt 108 is preferably of the type described in U.S. Pat. No. 6,341,927. The operative components to permit rotation of bolt 108 are preferably at least two cutouts 118 provided on the face of the convex head 109 and spaced away from the axis of rotation of the bolt. The cutouts are located, sized and shaped for engagement by the mating member on a specific key for rotation of the nut about its axis as described above for the U-Lock. The cutouts can use the same combination as for the U-Lock described above and therefore can use the same key. By recessing the head of the bolt 108 it makes it difficult to access it with common tools. A washer 111 is provided with a depending and outwardly extending tab 112. Washer 111 ("POG washer") is placed between the head of the bolt 108 and the recess 113 in the top cap 106 with tab 112 fitting into a slot 114 in top cap 106 and a second slot 115 in the stem 116 at the end 105 of the head set 100. The tab 112 on washer 111 prevents the top cap 106 from being turned in an effort to turn bolt 108. The side wall of top cap 106 can be extended and an end wall provided to result in a hidden locking system similar to the one described in FIGS. 2-5.

The head set of FIG. 6 provides a compact, light-weight headset locking system which is compatible with standard bicycle designs. The head set of the present invention overcomes problems with prior art through the use of a convex-head combination bolt which can be rotated/torqued only with the use of a matching key. The invention features a slotted cap with a recessed center cavity. When installed in its locked position, the combination bolt convex head is recessed within the center cavity of the slotted cap, thus preventing access by tools or other pointed objects which could be used to pry or dislodge the combination bolt. The slotted cap also prevents the use of pin-style universal wrenches (known by the tradename "Gator"-wrenches). The slotted perimeter of the cap causes such pin wrenches to become engaged in the cap, thus preventing their rotation of the combination bolt. The invention also features a POG washer which serves to prevent relative rotation between the slotted cap and the bicycle headset stem. This prevents removal of the lock by rotation of the slotted cap itself.

The slotted cap is inserted into the bicycle headset stem. The POG washer is then inserted into the recessed cavity of the slotted cap. The combination bolt is then inserted and tightened into the bicycle headset stem to prevent its removal from the bicycle frame. The center cavity of the slotted cap provides a recessed protective enclosure around the perimeter of the convex-head combination bolt, thus preventing pointed objects such as screwdrivers from gaining access to beneath the combination bolt head. The POG washer features a tangential leg which fits into the gap in the headset stem and the slot of the slotted cap to prevent their relative rotation. The combination bolt is threaded and tightened into the headset stem to provide an effective locking system which cannot be opened without the use of a matching combination key.

Figure 7:
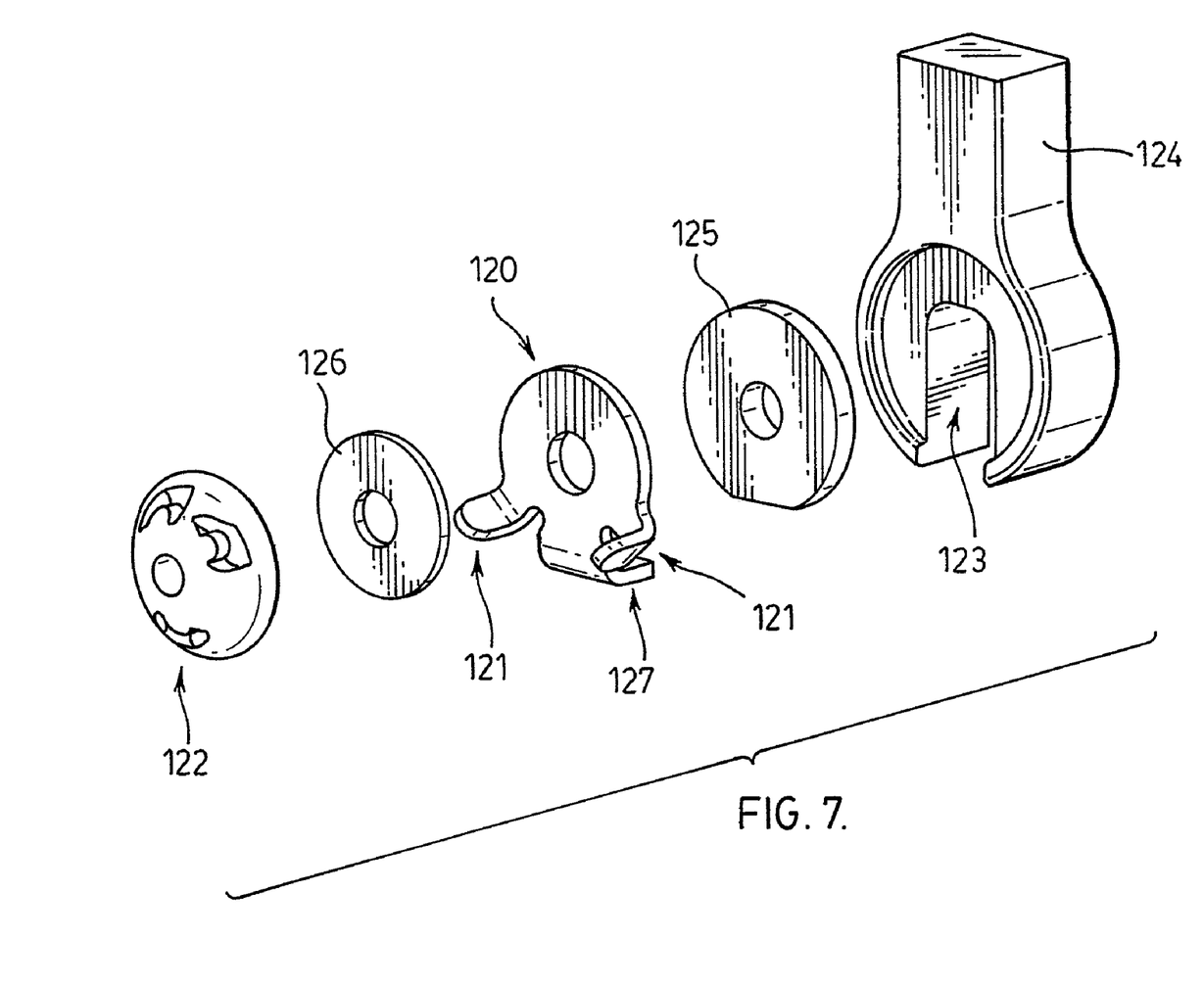
FIG. 7 is a schematic drawing of a tamper resistant POG washer for use in accordance with the present invention used in conjunction with a tamper resistant nut on a bicycle locking skewer (not shown).

Another example of a secondary component locking system utilizing the same key as the U-lock and head set is shown in FIG. 7. A variation of the POG washer, generally indicated at 120, with two upstanding tangential tabs 121 or legs can be used as illustrated in FIG. 7 with other applications of the tamper resistant fastener of the type described in U.S. Pat. No. 6,341,927, and incorporated herein by reference. FIG. 7 illustrates the use of the POG washer 120 with locking skewers (not shown) for the wheel of a bicycle. The two upstanding tangential legs 121 or tabs prevents the use of pin-style universal wrenches (known by the tradename "Gator"-wrenches) from turning the locking nut 122. The locking skewer on the bicycle wheel would fit into the slot 123 on the bicycle frame 124. The POG washer 120, together with conventional washer/spacers 125, 126 on either side of POG washer 120 slide over the end of the locking skewer that would extend beyond the bicycle frame 124. A depending flange 127 on POG washer 120 is adapted to fit in the slot 123 on the bicycle frame the prevent the POG washer 120 from turning. A tamper resistant locking nut 122 of the type described in U.S. Pat. No. 6,341,927 is then tightened on the threaded end of the locking skewer.

Figure 8:
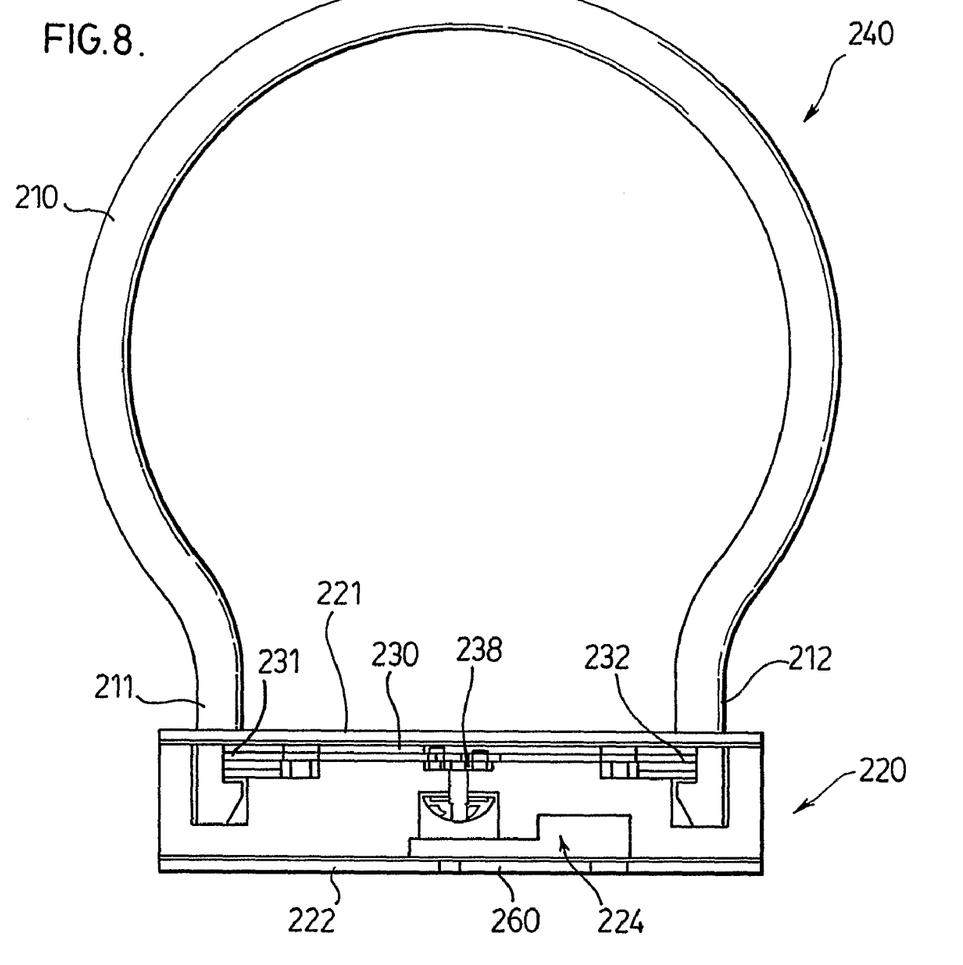
FIG. 8 is a plan view in cross-section of another embodiment of a bicycle lock having a shackle and lock housing according to the present invention.

In yet another embodiment of the invention, any shackle having a free end can be used for locking a variety of objects. Referring now to the drawings in detail, FIG. 8 illustrates a bicycle u-lock 240 comprising a shackle 210 releasably engaged on both ends in a lock housing 220.

The ends 211, 212 of the shackle 210 have inward facing grooves 211 which engage in the locked position with a left stop 231 and right stop 232 as described more fully below. When connected to the lock housing 220, the shackle 210 is designed to lock a bicycle wheel and or frame to a secure post, such as a standard bicycle rack.

The lock housing 220 has two sides, a shackle facing side 221 and a key facing side 222. The lock housing 220 is illustrated in the embodiment shown as rectangular-shaped but other shapes and sizes are within the scope of the present invention. On the shackle facing side 221, there are two cylindrical lock bodies 280, 281 as shown in FIG. 10, each of which receives a respective end 211, 212 of the shackle 210, as best illustrated in FIG. 8.

Figure 10:
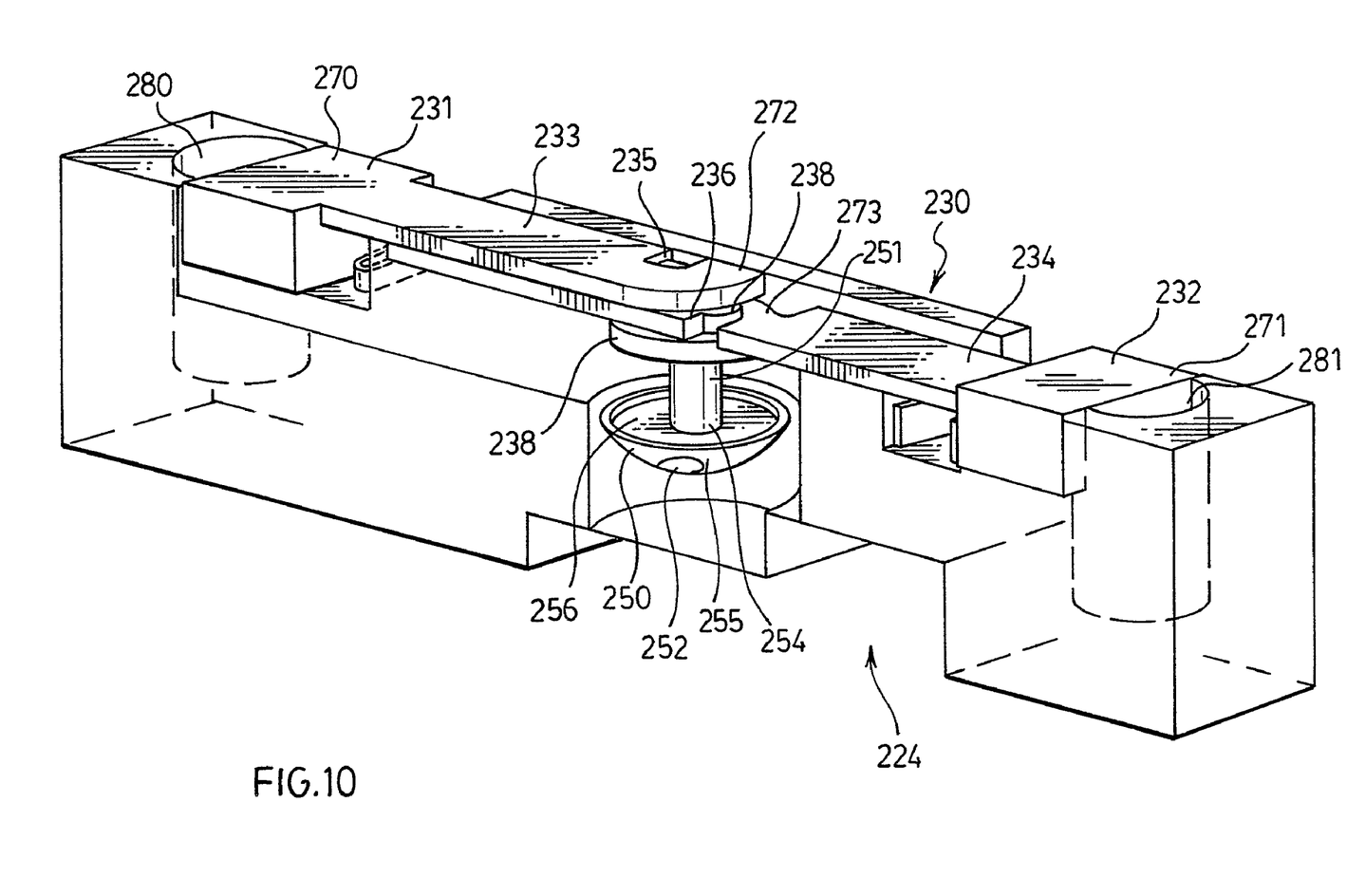
FIG. 10 is an expanded perspective schematic view of the lock housing of the bicycle lock of FIG. 8 without a protective enclosure.

As best illustrated in FIG. 10, the lock housing 220 includes an inner body 230, including, on its key facing side 222 a keyed access means, shown generally at 224. The inner body 230 is comprised of two links 233, 234 which are diametrically opposed to each other, each of which have a stop link 231 232 on each opposite end 270, 271 and wrench faces 235 and 236 on each facing end 272, 273. The two links 233 and 234 are connected with each other through their wrench faces 235 and 236, each of which is connected to a tooth 237 and 239 for each face. The teeth 237 and 239 are both mounted on a disc 238, which can be seen in FIG. 8. The bottom side of the disc 238 is connected to a driveably connectable means, such as a nut shaft 251, which houses a convex nut 250 at its distal end 254. Nut 250 has a convex top face 255 and a flat opposite surface 256. The nut 250 has at least one cutout 252 on its convex face and houses a spring 253 within the cavity of the nut 250.

Figure 9:
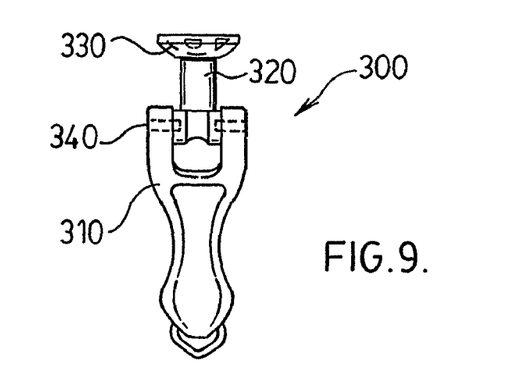
FIG. 9 is a perspective view of a key to be used with the bicycle lock of FIG. 8.

With reference to FIG. 9, a key 300 is provided. The key 300 has a handle 310, a plug 330, and a t-shaped shaft 320 connecting the handle 310 to the plug 330. With reference to the embodiment shown, a key 300 having only a mating member 330 and some form of handle can also be used, even where the shaft itself forms the handle. The t-shaped shaft 320 pivots about pivot screw 340 which connects the t-end of the shaft 320 to the handle 310, thereby allowing flexibility in operating the key 300 and locking system 340. The mating member 330 is concave-shaped having at least one protruding pin 331 which projects out of the concave face of the mating member 330 and is ready to be inserted into a cutout 352 having the same size, space and location to ensure a secure interaction.

To operate the bicycle u-lock 340 of FIG. 8, a key 300, as shown in FIG. 9, is inserted onto and into engagement with the nut 350 through the keyed access means so that the pin 331 interlocks with the cutout 252 and secures the nut with the mating member 330. Once engaged, when the key 300 turns left and has pressure applied in the direction of the shackle facing side 321, the spring 353 is compressed from its resting and expanded state simultaneously while the shaft 251 rotates about its vertical axis, causing the disc 239 to rotate left along its horizontal axis. The teeth 237 and 238 then pull each respective wrench faces 235 and 236 and consequently pull each link 233 and 234 towards each other. When the links 233 and 234 are pulled toward each other, their respective stop links 231 and 232 are also pulled inwards and create an opening in the cylindrical lock bodies and release the inward facing grooves 211 of a shackle 210. Once the inward facing grooves 211 are released, the ends of a shackle 210 are then free to slide out of the aperture and into the open position. Conversely, rotation of the key 300 to the right results in the stop links 231 and 232 wedging into the inward facing grooves 211, securely locking the ends of the shackle 210 within the lock housing 220 and into the closed/locking position.

As shown in FIG. 8, the means to access the mating member 330 with a nut 250 is unhindered. Nut 250 is recessed within nut end cover 260 to prevent direct access from the key facing side 222. As such, nut 250 cannot be engaged or rotated other than with a corresponding key 300 and is more difficult to tamper with than locks disclosed in the prior art. In order to operate the bicycle u-lock 240, the key 300 must be inserted sideways through a narrow slot in the key facing side 222 of the lock housing 220. Once inserted, the key 300 can then be plunged towards the nut 250 to create a positive and secure engagement.

To deter thieves from simply cutting through the shackle 210 and releasing the secured objects, the shackle 210 is preferably constructed of a sturdy, corrosion-free metallic material which cannot be readily broken, even with the use of a crowbar and the like.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A locking system having a locking mechanism that is locked and unlocked by rotation of a key inserted into keyed access means on the locking mechanism, said keyed access means is hidden from view, said keyed access means is housed within a protective enclosure having an outer wall which prevents engagement and rotation of the keyed access means by common tools, said keyed access means further comprises a nut having a convex top face and a flat bottom surface, said bottom surface driveably connectable to the locking mechanism, wherein the convex top face of the nut is provided with at least two cutouts spaced away from the axis of rotation of said nut and wherein means are provided within said outer wall to permit a key to be inserted from the side and then pushed into engagement with the keyed access means.

2. A locking system comprising a lock having a shackle inserted within a lock body and a locking mechanism within the lock body that is locked and unlocked by rotation of a key inserted into keyed access means on the locking mechanism, wherein said keyed access means is housed within a protective enclosure which prevents engagement and rotation of the keyed access means by common tools, said protective enclosure housing the keyed access means having an outer wall hiding operative components of the keyed access means from view and preventing the co-axial direct access to the keyed access means by tools in an effort to engage and rotate the keyed access means and wherein a slot is provided within the outer wall to permit a key to be inserted from the side and then pushed into engagement with the keyed access means and wherein said keyed access means has a nut having a convex top face and a flat bottom surface, said bottom surface driveably connectable to the locking mechanism wherein the convex top face of the nut is provided with at least two cutouts spaced away from the axis of rotation of said nut.

3. A locking system according to claim 1, wherein said means provided within said outer wall comprises a slot to permit a key to be inserted from the side and then pushed into engagement with the keyed access means.

4. A locking system according to claims 1, 2 or 3, further comprising a key having a body portion with a concave engaging surface with projections coded to match the size, shape and location of the cutouts on the keyed access means and wherein a shaft extends from a surface of the body portion opposite the concave engaging surface and at a free end of the shaft a handle is pivotally mounted to the shaft and wherein the shaft is sized to fit in the slot in the outer wall of the protective enclosure.

5. The locking system according to claims 1, 2 or 3, wherein the locking mechanism having within the lock body an inner tube that is adapted to be rotated by a key from a locking to an unlocking position and back, to lock and unlock the shackle within the lock body, the inner tube having an end plug at one end and a driven plug at the other end and means to connect the driven plug to the keyed access means.

6. The locking system of claim 5 wherein the means to connect the driven plug to the keyed access means comprises a driver biased away from contact with the driven plug, said driver having a projecting shaft sized and shaped to fit within a corresponding hole on a face of the driven plug and a face of the driver remote from said shaft is provided with the keyed access means.

* * * * *